(12) United States Patent
Isaacson

(10) Patent No.: US 12,530,499 B1
(45) Date of Patent: Jan. 20, 2026

(54) LIQUIDITY INTELLIGENCE PROVIDER

(71) Applicant: Cboe Exchange, Inc., Chicago, IL (US)

(72) Inventor: Christopher Andrew Isaacson, Lenexa, KS (US)

(73) Assignee: Cboe Exchange, Inc., Chicago, IL (US)

( * ) Notice: Subject to any disclaimer, the term of this patent is extended or adjusted under 35 U.S.C. 154(b) by 37 days.

(21) Appl. No.: 18/747,136

(22) Filed: Jun. 18, 2024

(51) Int. Cl.
*G06F 21/62* (2013.01)
*G06Q 40/04* (2012.01)

(52) U.S. Cl.
CPC ......... *G06F 21/6254* (2013.01); *G06Q 40/04* (2013.01)

(58) Field of Classification Search
CPC ............................ G06F 21/6254; G06Q 40/04
See application file for complete search history.

(56) References Cited

U.S. PATENT DOCUMENTS

| | | | | |
|---|---|---|---|---|
| 7,912,775 B1* | 3/2011 | Brill | ................ | G06Q 40/08 705/37 |
| 8,478,682 B2* | 7/2013 | Agbor | .................. | G06Q 40/04 705/37 |
| 10,229,457 B2* | 3/2019 | Cicero | ................. | G06Q 40/04 |
| 10,846,796 B2* | 11/2020 | Tassone | ............... | G06Q 40/04 |
| 11,954,733 B1* | 4/2024 | Boraiah | ............... | G06F 16/27 |
| 11,995,719 B1* | 5/2024 | Isaacson | ............... | G06F 9/466 |
| 2009/0037327 A1* | 2/2009 | Rosca | ................... | G06Q 20/10 705/1.1 |
| 2013/0066758 A1* | 3/2013 | Petruzzi | ............... | G06Q 40/04 705/37 |
| 2017/0257325 A1* | 9/2017 | Chauval | ................ | H04L 67/61 |
| 2021/0089075 A1* | 3/2021 | Wong | ................... | G06F 16/9535 |
| 2021/0118083 A1* | 4/2021 | Dharmar | .............. | H04L 67/125 |
| 2021/0224728 A1* | 7/2021 | Nabicht | .............. | G06Q 10/087 |
| 2022/0284511 A1* | 9/2022 | Toffey | ...................... | G06N 3/08 |
| 2022/0374880 A1* | 11/2022 | Mallela | ................. | G06Q 20/02 |
| 2023/0289880 A1* | 9/2023 | Blake | .................... | G06Q 40/04 |
| 2023/0306352 A1* | 9/2023 | Kim | ................. | G06Q 10/06398 |
| 2023/0401336 A1* | 12/2023 | LaFever | ............. | G06F 21/6245 |
| 2024/0104585 A1* | 3/2024 | Singh | ................. | G06Q 30/0201 |
| 2024/0104643 A1* | 3/2024 | Messineo | ........... | G06Q 30/0609 |
| 2025/0095014 A1* | 3/2025 | Magdelinic | ........... | G06Q 40/04 |

* cited by examiner

*Primary Examiner* — Gary S Gracia
(74) *Attorney, Agent, or Firm* — Fish & Richardson P.C.

(57) ABSTRACT

An exchange computer system, a method, and non-transitory computer-readable storage media for generating anonymized price values. The computer system includes a liquidity engine having one or more processors with machine-readable instructions that, when executed, cause the one or more processors to perform operations including receiving data from one or more liquidity providers, anonymizing the received data to remove identification information that is descriptive of the one or more liquidity providers, determining a midpoint price of a financial instrument based on the anonymized data, and determining a bid-offer spread corresponding to the midpoint price based on the anonymized data, and a transceiver coupled to the one or more processors of the liquidity engine and configured to transmit the midpoint price and the bid-offer spread over a computer network to one or more computing devices associated with a market participant.

21 Claims, 8 Drawing Sheets

LIQUIDITY INTELLIGENCE PROVIDER

BACKGROUND

High volumes of financial instruments, such as derivatives, stocks, and bonds, are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO).

SUMMARY

In an electronic or hybrid exchange environment, thousands of transactions are executed each second, and unforeseen events occur frequently. Many market participants rely on intelligence derived from market data to inform their decisions and actions, but individual participants lack the technological means to continuously monitor the vast amount of data generated each second through trading activity. An exchange computer system with sufficient bandwidth and processing resources can, however, translate the data flowing through it and available from other networked sources into actionable intelligence that connected users can rely upon.

For example, and as described in more detail within this disclosure, an exchange computer system can be configured to facilitate trading of foreign exchange currencies (e.g., Forex, FX). Participants in FX exchanges can bid, buy, offer, and/or sell various currencies in various volumes that can impact market liquidity. FX data providers can provide information about FX trades (e.g., bid prices, offer prices, trade volume information, and/or other information based on these and other values). FX providers can provide liquidity, such as the ability to buy and sell currency pairs in the forex market. FX participants can be the buyers and sellers of currency pairs. In some examples, FX data providers can offer information services to FX participants in which the FX participants can receive real-time or near-real-time information about FX trading activity, such as individual trades or the activity of individual participants. Such information can flow in large, rapid volumes, and can be bandwidth-intensive and/or processor-intensive to handle and can have a high computing cost as a result. FX participants can pay FX data providers an access or subscription fee in order to access such FX information data products.

Furthermore, some FX providers may consider their FX activity to be sensitive information. For example, an observer may be able to estimate or infer an FX provider's liquidity based on the FX provider's trading activity. Such estimates and inferences may give some FX participants an undesirable or unfair informational advantage that is not available to other FX participants, and/or could be detrimental to the FX provider.

An exchange computer system implemented in accordance with the technology described in this specification, and with sufficient bandwidth and processing resources can, however, translate the data flowing through it and available from other networked sources into actionable intelligence that connected users can rely upon in a way that at least partly resolves the issues of information sensitivity, fairness, availability, and more.

For example, and as described in more detail within this disclosure, an exchange computer system can be implemented in a manner enabling it to dynamically, efficiently, and continuously generate an aggregated and obfuscated (e.g., anonymized) collection of data products that can be provided efficiently and economically to market participants.

Continuously updating and disseminating the data products to a plurality of connected computing devices based on data received by the exchange computer system in real-time or near-real-time enables the users associated with those devices to rapidly take responsive actions that otherwise would have been unavailable to them, and to implement complex strategies involving exchange instruments based on the exchange liquidities for which the values are generated.

For example, the exchange computer system can receive a collection of information about recent FX liquidity activities (e.g., bids/offers/purchases/sales happening during the last second, minute, hour, day) for a particular financial instrument. The exchange computer system can aggregate the FX activity information to determine midpoint price of the FX market for the financial instrument. The exchange computer system can also determine a bid/offer spread and/or an average bid/offer size associated with the determined midpoint value.

Since the midpoint price, the spread, and the average size values are a result of aggregation, the underlying trade information can be anonymized, thereby preserving the privacy of the market participants. In some implementations, identification information can be removed from order prior to aggregation, such that anonymized information is used to feed the aggregation process. In calculating and disseminating the aggregate information, a predetermined or pseudorandom delay can be introduced before the information is provided to data consumers. By at least partly timewise-decoupling trading activity from the provision of the resulting aggregate data products, the activities of individual market participants can be further obfuscated, making it more difficult to infer the identities and activities of individual market trading participants and/or individual trades.

Aggregation of exchange liquidity trade information can also reduce the computing costs, bandwidth requirements, and the resulting expense of generating, distributing, and receiving exchange liquidity information. For example, the information about tens, hundreds, or thousands of exchange participants and their trades can be reduced to a small collection (e.g., two or three) values or data streams (e.g., the aggregated midpoint price, spread, and/or average size values). Instead of directly redistributing the potentially thousands of activity data points of thousands of participants to potentially thousands of data consumers multiple times per second, the aggregate values can be computed once and provided multiple times instead, thereby reducing the amount of computations needed, reducing the volume of data that needs to be transmitted over a network to data consumers, and reduce the latency of such data (e.g., due to the fewer required computations and reduced time needed to transmit the reduced data sets).

Aggregation of exchange liquidity trade information can also improve the performance of exchange computer systems. For example, by providing exchange data consumers with a computationally efficient alternative to the full, non-aggregated exchange activity data, fewer computing resources of the exchange computer systems would be required for providing the full, non-aggregated exchange activity data, thereby reducing the exchange's computing hardware and energy requirements, and/or freeing up exchange computer system capacity for other tasks and data products.

Aggregation of exchange liquidity trade information can also improve the performance of computer networks. The aggregated data can be expressed in a number of bytes that is one or more magnitudes of order less than the number of bytes needed to express the full, non-aggregated exchange activity data. By communicating data in comparatively fewer bytes, correspondingly fewer network resources can be used transmit exchange liquidity trade information between exchange computer systems and/or data consumers. Use of aggregated data can reduce the overall utilization and requirements for network capacity, and/or free up network bandwidth/resources for other purposes.

Aggregation of exchange liquidity trade information can also improve the performance of exchange liquidity trading. For example, markets can change multiple times per second, and many exchange traders implement computer-operated, algorithmic trading strategies. When markets can shift in a matter of milliseconds, the use of aggregated data can also reduce the amount of time that it takes to convey exchange liquidity trade information to exchange traders. As a result, exchange traders (and/or their trading algorithms) can receive, interpret, and respond more quickly to exchange market shifts, thereby helping exchange traders make more timely, more accurate, and therefore potentially more profitable trades.

In an example aspect, a computer system includes a liquidity engine having one or more processors with machine-readable instructions that, when executed, cause the one or more processors to perform operations including receiving data from one or more liquidity providers, anonymizing the received data to remove information identifying the one or more liquidity providers, determining a midpoint price of a financial instrument based on the anonymized data, and determining a bid-offer spread corresponding to the midpoint price based on the anonymized data, and a transceiver coupled to the one or more processors of the liquidity engine and configured to transmit the midpoint price and the bid-offer spread over a computer network to one or more computing devices associated with a market participant.

In an example aspect, one or both of the midpoint price and the bid-offer spread can be determined based on anonymized liquidity provision data from one or more liquidity providers recorded during a predetermined period of time.

In an example aspect, one or both of the midpoint price and the bid-offer spread can be determined in substantially real-time.

In an example aspect, one or both of the midpoint price and the bid-offer spread can be valid for a predetermined period of time after being determined.

In an example aspect, the machine-readable instructions can be further configured to identify one or more trades of the financial instrument, and the transceiver can be further configured to transmit the identified one or more trades over the computer network to the one or more computing devices associated with the market participant.

In an example aspect, the machine-readable instructions can be further configured to delay, by a predetermined amount of time, transmission of one or both of the determined midpoint price and the determined bid-offer spread.

In an example aspect, the machine-readable instructions can be further configured to determine an average bid-offer spread corresponding to the determined bid-offer spread.

In another example aspect, a non-transitory computer-readable storage medium storing instructions that, when executed by one or more processors in an exchange computer system, cause the one or more processors to perform operations including receiving data from one or more liquidity providers, anonymizing the data to remove information identifying one or more liquidity providers, determining a midpoint price of a financial instrument based on the anonymized data, determining a bid-offer spread corresponding to the midpoint price based on the anonymized data, and transmitting the midpoint price and the bid-offer spread over a computer network to one or more computing devices associated with a market participant.

In an example aspect, one or both of the midpoint price and the bid-offer spread can be determined based on anonymized liquidity provision data from the one or more liquidity providers recorded during a predetermined period of time.

In an example aspect, one or both of the midpoint price and the bid-offer spread can be determined in substantially real-time.

In an example aspect, one or both of the midpoint price and the bid-offer spread can be valid for a predetermined period of time after being determined.

In an example aspect, the operations can further include identifying one or more trades of the financial instrument, and transmitting the identified one or more trades over the computer network to the one or more computing devices associated with the market participant.

In an example aspect, the operations can further include delaying, by a predetermined amount of time, transmission of one or both of the determined midpoint price and the determined bid-offer spread.

In an example aspect, the operations can further include determining an average bid-offer spread corresponding to the determined bid-offer spread.

In another example aspect, a method includes receiving data from one or more liquidity providers, anonymizing the data to remove information identifying one or more liquidity providers, determining a midpoint price of a financial instrument based on the anonymized data, determining a bid-offer spread corresponding to the midpoint price based on the anonymized data, and transmitting the midpoint price and the bid-offer spread over a computer network to one or more computing devices associated with a market participant.

In an example aspect, one or both of the midpoint price and the bid-offer spread can be determined based on anonymized liquidity provision data from the one or more liquidity providers recorded during a predetermined period of time.

In an example aspect, one or both of the midpoint price and the bid-offer spread can be determined in substantially real-time.

In an example aspect, one or both of the midpoint price and the bid-offer spread can be valid for a predetermined period of time after being determined.

In an example aspect, the method can also include identifying one or more trades of the financial instrument, and transmitting the identified one or more trades over the computer network to one or more computing devices associated with the market participant.

In an example aspect, the method can further include determining an average bid-offer spread corresponding to the determined bid-offer spread.

The details of one or more implementations of the subject matter described in this specification are set forth in the accompanying drawings and the description below. Other potential aspects, features, and advantages will be apparent from the description, the drawings, and the claims.

DETAILED DESCRIPTION

The disclosure that follows relates to technology enabling anonymization and aggregation of market liquidity (e.g., foreign exchange (FX) and other liquidities) information and other exchange trade activity to provide actionable intelligence to market participants. The aggregated exchange trade activity by the disclosed technology can enhance the usefulness of certain trading strategies to market participants, by offering an immediate, highly representative, and effective estimate of bids and offers in exchange liquidity markets. For example, a user can receive aggregate data about the bids and offers of one or more exchange liquidities in the form of midpoint price, bid/offer spread, and average bid/offer values, enter an order for an exchange liquidity, e.g., call or put option, based on the aggregate values, and have that order quickly facilitated through the exchange computer system.

A liquidity engine can generate anonymized exchange trade activity by aggregating liquidity information (e.g., liquidity reports, information on bid, offer, buy, and/or sell activity of multiple exchange participants) and identifying a midpoint price, and/or a bid/offer spread about the midpoint price. In addition, the liquidity engine can generate an average bid/offer size based on the aggregated exchange trade activity information. In some cases, beneficially, by aggregating the midpoint price, bid/offer spread, and average bid/offer values, details about the underlying exchange trades and the identities of the underlying exchange traders becomes obfuscated and anonymized.

The techniques described in this specification can provide a data product that can aid exchange liquidity takers while protecting the privacy of exchange providers. In some cases, raw exchange trade information can directly or indirectly reveal the identity and/or liquidity of a liquidity provider and can allow other exchange participants to make trades that are adverse to the liquidity provider. For example, a market participant can obtain information that a party of interest, e.g., competitor, has taken certain trading positions and that the market for a particular financial instrument consequently has a certain amount of liquidity. In response, the market participant may take certain actions that can have an adverse impact on the party of interest, who may be a liquidity provider (e.g., by driving exchange rates in a way that is adverse to the competitor). By anonymizing exchange trading information, the identities and actions of liquidity providers can be protected. Such protection and risk reduction creates an environment that encourages further activity by liquidity providers thereby increasing the utility of the exchange computer system.

Figure 1:
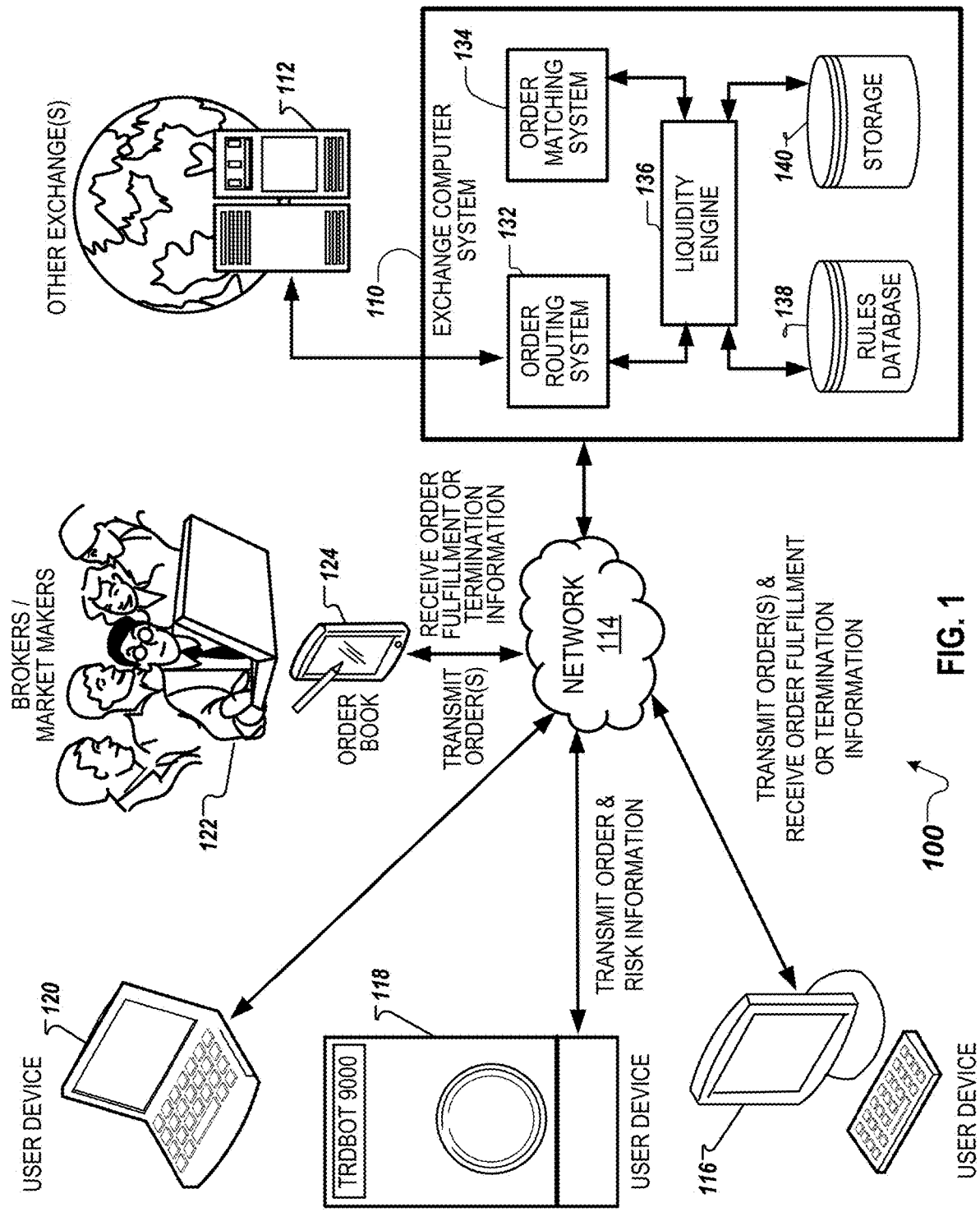
FIG. 1 is an example diagram of an exchange computer system and associated networks, devices, and users.

FIG. 1 is a diagram of an example trading environment 100 for generating an anonymized market values that may include an exchange computer system and the associated networks, devices, and users. Generally, the term "user" may refer to any entity that interacts with the exchange computer system and/or associated networks and devices. Users may include, for example, market makers and other market professionals, brokers, institutional traders, individual traders, and automated trading systems. The diagram may include an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures contracts, or other derivatives associated with an underlying asset. In some cases, the exchange computer system 110 can receive liquidity reports that indicate market liquidity for one or more financial instruments or trading positions taken by one or more market professionals.

Network 114 connects the various components within the trading environment and may be configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110 and may also receive data from the exchange computer system 110 indicating that an order has been filled or canceled.

Users such as market makers/brokers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a liquidity engine 136, a database 138 of trading rules and algorithms, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The liquidity engine 136 may be implemented using a combination of software and hardware. The liquidity engine 136 may, for example, be implemented as one or more hardware processors configured to execute one or more algorithms, as described in further detail below. An example configuration of an exchange computer system featuring a liquidity engine is further described in FIG. 2.

The liquidity engine 136 may generate and disseminate an aggregated market liquidity value (e.g., FX liquidity value), and to provide an average spread (e.g., bid/offer) and/or average bid/offer for the market liquidity. In some cases, the liquidity engine 136 may generate the aggregated market liquidity value for selected currency pairs, by following processes further described in FIG. 4 below. After generating the aggregated market liquidity value corresponding to the currency pair, the liquidity engine 136 may disseminate the aggregated market liquidity values to other exchanges (e.g., exchanges 112) and one or more user devices (e.g., user devices 116, 118, 120) by the network 114.

As noted above, the generation and dissemination of aggregated market liquidity values significantly reduces the bandwidth and computing resources required by both the exchange computer system 110 and networked computer systems (e.g., user devices 116, 118, and 120) in each of several ways.

For example, by generating and disseminating accurate values of an aggregated market liquidity, the liquidity engine 136 relieves the multitude of systems receiving those values of the computational burdens associated with monitoring data flows representative of relevant market conditions, and with redundantly calculating estimations of the values. In at least this way, the liquidity engine 136 frees up computational resources throughout network 114.

Moreover, as a component of exchange computer system 110, the liquidity engine 136 is well suited to the role of a centralized and authoritative arbiter of liquidity values, at least as far as it is able to efficiently generate the values based on data to which exchange computer system 110 already has access. In contrast, and absent the service provided by liquidity engine 136, other systems (e.g., user devices 116, 118, and 120) would need to redundantly devote significant bandwidth to monitoring this data.

As another example, liquidity engine 136 vastly reduces the number of information streams that need to be sent, received, and processed in connection with strategies leveraging the information captured and represented by the aggregated market liquidity values. More specifically, the information provided by liquidity engine 136 enables connected devices to practically leverage financial instruments based on the aggregated market liquidity data. That, in turn, minimizes the number of orders involved in implementing and fulfilling complex strategies that would otherwise require trading of a variety of component options, with relatedly higher computational expenditure.

Additionally, the practical application of aggregate market liquidity values and related financial instruments enables fulfillment of these complex strategies with significantly less network traffic than would otherwise be necessary, at least by virtue of the reduced numbers of parallel information feeds involved.

In at least these ways, the generation and dissemination of aggregated market liquidity values, and the processing of orders involving financial instruments related to the aggregated market liquidity index, dramatically improves the computational efficiency with which complex strategies can be implemented and fulfilled.

For instance, the exchange computer system 110 could facilitate and fulfill large numbers of transactions for connected users implementing strategies involving market liquidity trades, at a significant cost in bandwidth and processing resources. But exchange computer system 110 can alternatively facilitate implementation of similarly complex strategies involving financial instruments based on the aggregated market liquidity data with far fewer transactions (and correspondingly less bandwidth and resource expenditure for all systems involved).

Alternatively, or in addition, liquidity engine 136 may reduce the bandwidth and computing resources required by networked systems by computing and disseminating updated aggregated market liquidity values (e.g., FC liquidity values) in response to events detected by exchange computer system 110 (for example, detected volume of orders, data traffic flow, trading patterns, or other market activity). The liquidity engine 136 can, for example, be configured to generate and disseminate updated aggregated market liquidity values in response to detection of one or more of these events, with corresponding computational efficiencies for networked systems.

The exchange computer system 110 may also facilitate an order for a financial instrument corresponding to the aggregated market liquidity value. For example, the exchange computer system 110 may be configured to receive data from one or more user devices (e.g., user devices 116, 118, and 120) by the network 114 connected to the exchange computer system 110. The exchange computer system 110 facilitates the transaction by determining a second order in the electronic order book 124 matches the order described in the received data. The exchange computer system 110 may utilize the ORS 132 to route the order from the received data and the OMS 134 to match the second order in the electronic order book 124 to the order.

The exchange computer system 110 may also be configured to simultaneously receive (e.g., by the network 114 and ORS 132 of the exchange computer system 110) from one or more user devices, multiple orders for a financial instrument corresponding to the aggregated market liquidity values.

In some implementations, the exchange computer system 110 is a distributed computer system that includes an order entry port (e.g., by network 114), an order routing system (e.g., ORS 132), an order matching system (e.g., OMS 134), and a liquidity engine (e.g., liquidity engine 136). The distributed computer system may operate multiple hardware and software processes in parallel configurations. The order entry port receives the order from the data sent to the exchange computer system by a user device and the order routing system is configured to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and liquidity engine 136), the fill information is passed through the OMS 134 and the ORS 132 to one or more user devices 116, 118, 120, and 124, and to the liquidity engine 136. The OMS 134 can match the buy side and sell side of a trade and forwards the matched trade to a third-party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA).

Figure 2:
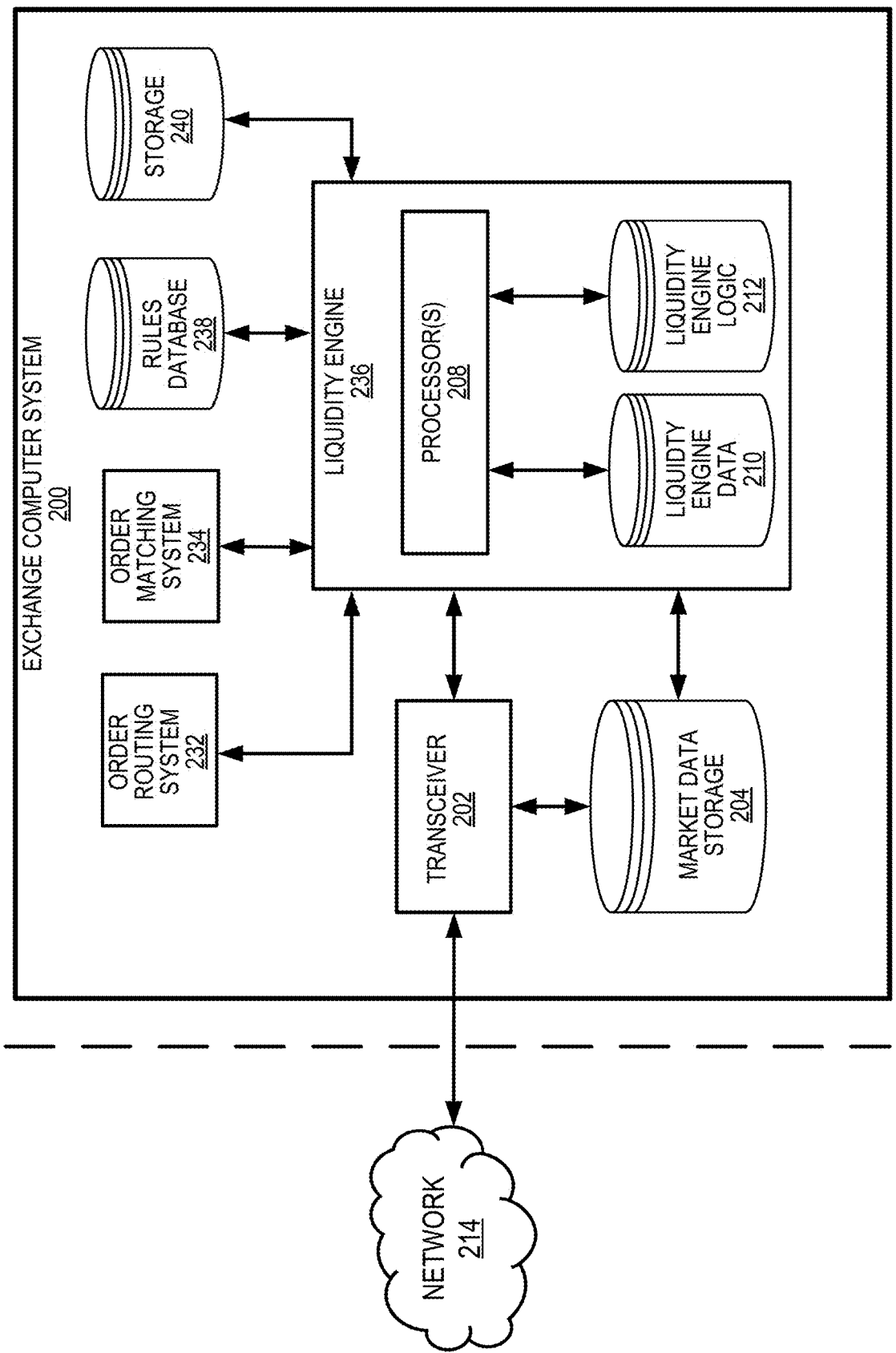
FIG. 2 is an example diagram of an exchange computer system including an index engine.

FIG. 2 is a diagram of an example exchange computer system 200 including a liquidity engine 236 configured to generate aggregated market (e.g., FX) liquidity values. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a market data storage 204 (e.g., a FX market data storage). The communication interface 202 may be communicatively linked to a liquidity engine 236, which includes a liquidity engine processor 208, liquidity engine data 210, and liquidity engine logic 212. The liquidity engine 236 may also be communicatively linked to an ordering matching system 234, an order routing system 232, a rules database 238, and storage 240 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMAX network, or any other type of network. Further, network 214 may be a public network, such as the Internet, a private network, such as an intranet, or combinations thereof, and may utilize a variety of networking protocols now available or later developed including, but not limited to TCP/IP based networking protocols.

The liquidity engine processor 208 may include one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. The liquidity engine processor 208 may carry out one or more instructions using one or more arithmetic, logical, and/or input/output operations. Though liquidity engine processor 208 is illustrated as a single component, liquidity engine processor 208 may be integrated in whole or in part with other components of the exchange computer system 200.

Data storage e.g., market data storage 204 and liquidity engine data 210, may be a main memory, a static memory, or a dynamic memory. Market data storage 204 and storage for liquidity engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, the market data storage 204 and storage for liquidity engine data 210 may include a cache or random-access memory for the liquidity engine processor 208. Market data storage 204 and storage for liquidity engine data 210 may be separate from the liquidity engine processor 208, such as a cache memory of a processor, the system memory, or other memory. Market data storage 204 and storage for liquidity engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the liquidity engine 236 may include liquidity engine data 210 and/or liquidity engine logic 212. The liquidity engine data 210 may include one or more types of data suitable for a given implementation. For example, liquidity engine data 210 may include data (such as input datasets) that may be stored in memory. The liquidity engine logic 212 may include, for example, machine language instructions executable by liquidity engine 236 to carry out various functions, such as the functionality of the methods and systems described herein. In some implementations, the functions, acts or tasks may be independent of the particular type of instructions sets, storage media, processor or processing strategy and may be performed by software, hardware, integrated circuits, firmware, micro-code and the like, operating alone or in combination. Processing strategies may include multiprocessing, multitasking, parallel processing and the like.

The liquidity engine 236 is an example of the liquidity engine 136 described in reference to FIG. 1 above. The liquidity engine 236 can be configured to generate aggregated market liquidity values representing anonymized representations of a collection of market liquidity trades that occurred during a selected period of time. For example, generating the aggregated market liquidity values can include determining a midpoint price of a financial instrument (e.g., a currency pair in a FX trade) based on a collection of underlying market liquidity data (e.g., data related to a selected currency pair). Generating the midpoint price can include identifying a collection of market liquidity transactions (e.g., sales) performed by a collection of market providers over a predetermined period of time (e.g., the last 15 seconds, the last minute, the last hour, the last day), and then identifying or calculating a midpoint or average value of the identified sale prices.

For each midpoint price, the liquidity engine 236 can obtain options data from a data source, and can be configured to determine (e.g., extract, identify) the date or time for a liquidity status. The liquidity engine 236 can be configured to perform data pre-processing of the options data, e.g., removing duplicate entries, standardizing data formats, removing outlier/invalid data From the midpoint price, the liquidity engine 236 is configured to generate a bid/offer spread value representing the variance of actual bids and offers above and below the midpoint price, based on the same collection of underlying data used to determine the midpoint price. In forex trading, a spread is the difference between the bid (sell) price and the ask (buy) price of a currency pair. It is usually measured in pips, which is the smallest unit of price movement for a currency pair. One pip is equal to 0.0001, or one-hundredth of one percent. To calculate a forex pair's spread, the liquidity engine 236 subtracts bid prices from ask prices and provides spread values that represent the differences.

The liquidity engine 236 is also configured to generate values representative of the average bids and the average offers surrounding the midpoint prices for one or more selected trading instruments, based on the same collection of underlying data used to determine the midpoint price. In forex trading, the selected trading instruments can be selected currency pairs, and the generated values can include an average (e.g., a rolling average over a predetermined period of time, such as an hour, day, or week) of the bid price(s) and/or an average of the offer price(s) for one or more selected currency pairs.

In the exchange computer system 200, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in market data storage 204. The communication interface 202 may also be configured to communicate all or part of the input datasets to the liquidity engine 236 once the input datasets are stored or otherwise processed. The communication interface 202 may include a transceiver having one or more input/output ports connected to the network 214 to securely transmit anonymized market instrument values (e.g., FX currency pairs) and related values (e.g., average bids/asks, spreads) from the liquidity engine 236 to user computing devices.

As an example, the input datasets stored in market data storage 204 may be partitioned (e.g., horizontal, vertical, functional) into designated memory locations (e.g., virtual addresses) based on qualities of the input datasets, e.g., currency pair, a type of market index option, a type of option. In some implementations, the input datasets with data related to component currency pairs may be stored in market data storage 204 and include a linking identifier (e.g., address, memory mapping) to identify a corresponding stock for each of the component currency pairs. In some implementations, the market data storage 204 may be configured to receive an indicator describing the operating status (e.g., receiving, clearing, storing) input datasets of the communication interface 202.

The input datasets from the communication interface 202 may include market data (e.g., market intelligence) corresponding to a market index and the component currency pairs corresponding to the market index. For example, market data may include volatilities, interest rates, returns (e.g., historical, expected), market capitalization, sector, prices, liquidity, and other metrics related to the currency indices. Market data may also include measures, estimates, and other related data for options (e.g., calls, puts), futures, and other derivatives for the market index and component currency pairs. The input datasets may also include corresponding log files to describe and store the market data e.g., a log file describing volatility for each component current pair. The log files may include metadata to tag or characterize data, e.g., corresponding time periods for which the data was recorded. For example, the log files may include a tag to be used for sorting or filtering the data of the log files.

Upon receiving input datasets from the communication interface 202, including data stored in the market data storage 204, the liquidity engine 236 may perform further processes including receiving requests and accessing metadata. The liquidity engine 236 may perform operations using the liquidity engine processor 208, with instructions stored in the liquidity engine logic 212, and data stored in liquidity engine data 210. The data stored in liquidity engine data 210 may include all of or a subset (e.g., filtered) of the data stored in market data storage 204, where the subset of the data stored in the liquidity engine data 210 is filtered based on a specified time period. The liquidity engine 236 may perform operations on the liquidity engine data 210 including deleting, archiving, tagging, and resetting. The liquidity engine 236 can utilize metadata, including log files, to process (e.g., filtering, sorting) the liquidity engine data 210.

The liquidity engine 236 may also access other components of the exchange computer system 200 including the order matching system 234, order routing system 232, rules database 238, and storage 240. The order matching system 234 may be configured to match an order received from the user device (e.g., user devices 116, 118, and 120) to another order based on the matching rules stored in the rules database 238. The order routing system 232 may be configured to route the order received from the user device to a destination associated with the order. The storage 240 may include additional data from the exchange computer system 200, accessed by the liquidity engine 236 for processing.

An exchange computer system 110 of FIG. 1 or exchange computer system 200 of FIG. 2 that includes the liquidity engine 236 can be configured to generate one or more aggregated exchange liquidity indexes for one or more exchange liquidities. For example, the liquidity engine 236 can be configured (e.g., by liquidity engine logic 212) to obtain data through the communication interface 202 such as data related to currency pairs for an underlying asset, data to the exchange market index, and data related to exchange options of the underlying asset. The liquidity engine logic 212 configures the liquidity engine 236 to process the data and perform the steps to generate an aggregated exchange liquidity index and the corresponding aggregated exchange liquidity values, as described in reference to FIG. 4 below. By coupling the liquidity engine 236 to exchange computer system components, such as order routing system 232, order matching system 234, rules database 238, etc., the liquidity engine 236 allows the exchange computer system to be configured to generate an aggregated exchange liquidity index that can be traded (e.g., executed through orders) to user devices (e.g., user devices 116, 118, and 120) described in reference to FIG. 1 above.

The liquidity engine 236 and related components (e.g., liquidity engine processor 208, liquidity engine data 210, liquidity engine logic 212) include software and hardware that are configured to generate the aggregated exchange liquidity index and aggregated exchange liquidity values. In contrast to exchange computer systems without the liquidity engine 236, the liquidity engine 236 provides the exchange computer system 200 with a higher throughput to process signals (and associated data from the signals) between the exchange and data sources, e.g., FX market data from other exchanges, order information from user devices. Furthermore, the liquidity engine 236 is configured to process subsets of signals that are relevant to the generation of aggregated exchange liquidity values, among from large volumes of signals (e.g.,) data, received by the exchange computer system 200.

In some implementations, the communication interface 202 can be expanded to include additional ports that are configured to provide dataflow to and from the liquidity engine 236 of the exchange computer system 200. The expansion of data flow ports that are uniquely configured the memory for the liquidity engine processor 208 can be expanded to process additional data. In some implementations, the liquidity engine logic 212 can be further programmed to correlate data received, e.g., by the communication interface 202, and thus allow the exchange computer system to pre-allocate resources to determine aggregated exchange liquidity indexes and values.

In some implementation, the exchange computer system 200 can be configured to generate a notification (e.g., an alert) based on aggregated FX liquidity values. The liquidity engine 236 can generate aggregated exchange liquidity values, and the exchange computer system 200 can be configured to determine if an imp aggregated exchange liquidity value meets particular criteria or a condition. Examples of conditions can include the aggregated exchange liquidity value exceeding a threshold value, falling below a threshold value, or maintaining a value in a range of values for a duration of time. Upon detection of the criteria based on the aggregated exchange liquidity value, the exchange computer system 200 can generate an alert and provide the alert to computing devices that are connected to the exchange computer system 200, such as user devices 116, 118, and 120. The alert can be provided to other connected exchanges, e.g., exchanges 112.

The alert can indicate to receiving devices that the value or related value for an aggregated exchange liquidity index indicates an exchange computer system is likely to execute and facilitate orders based on price movement of underlying instruments (e.g., currencies), their options, and the exchange market index made up of component instruments for the assets. In some cases, the alert indicates a low price movement, a high price movement, a target threshold value of price movement, a range of price movements, thus providing an indication that through the exchange computer system that there is a corresponding likelihood of orders executing and facilitating on the exchange computer system due to market conditions, e.g., market expectations. Providing the alert to computing devices can inform market participants that market conditions are resulting in turbulent price movements, e.g., upsides and downsides, and can result in fewer orders being submitted to an order book of the exchange computer system. Thus, the alert allows for improved timing when receiving, submitting, and executing orders, in response to expected market conditions and corresponding impact to prices of underlying assets and their corresponding options.

As noted above, the exchange computer system 110 can securely transmit a series of aggregated exchange market values generated based on data received over successive periods of time to connected user computing devices (e.g., user devices 116, 118, 120) that are themselves configured to display the aggregated exchange liquidity values. The values may be displayed, for example, within a graphical user interface of an application that facilitates continuous real-time trading, through the exchange computer system, of financial instruments related to the aggregated exchange liquidity values.

Figure 3A:
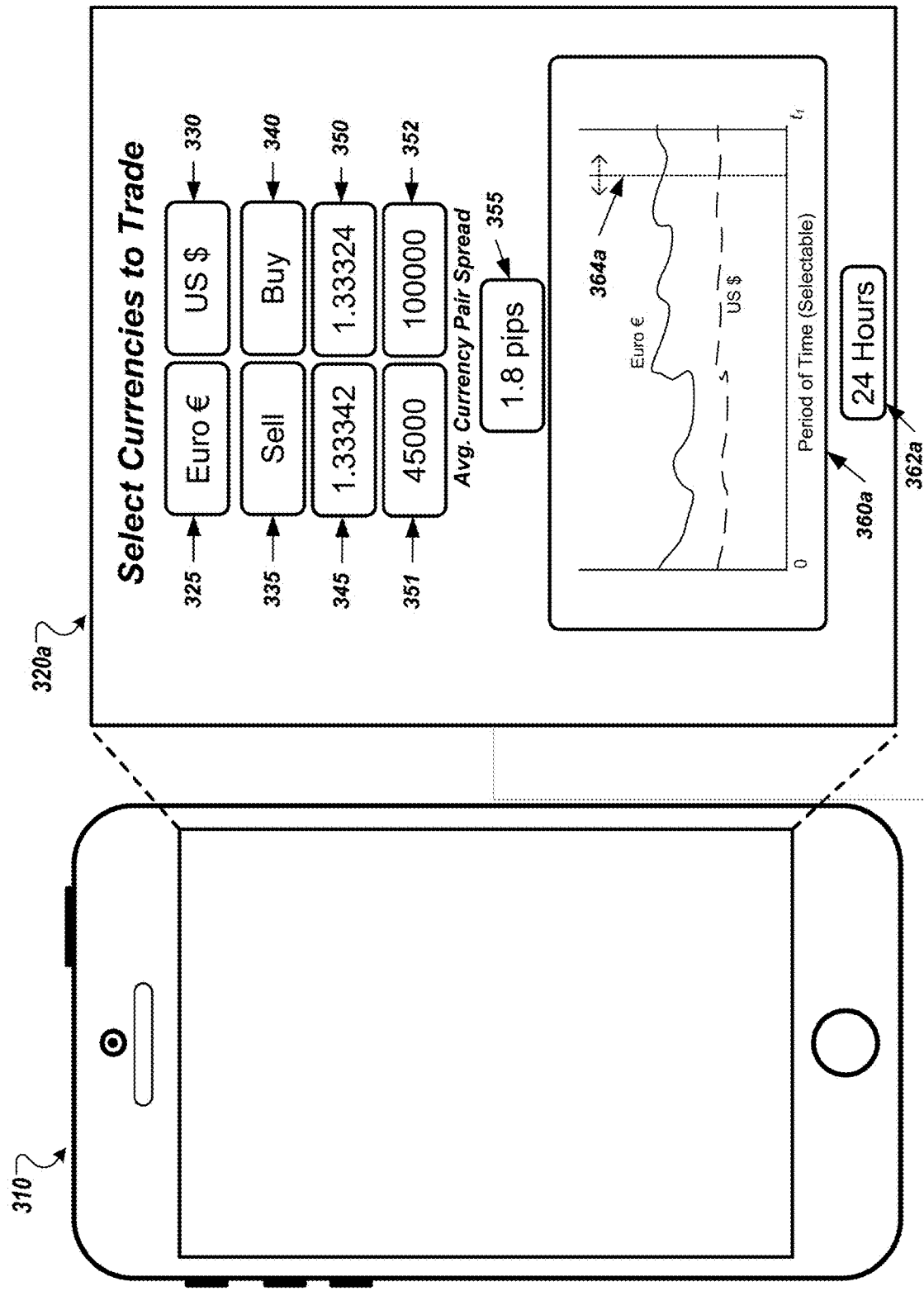
FIG. 3A is an illustration of an example graphical user interface for display of anonymized market values and trading of financial instruments based on the anonymized market liquidity values.

FIG. 3A is an illustration of a graphical user interface on a device 310 for displaying market data, displaying aggregated exchange (e.g., FX) values, and submitting one or more orders. A client device (e.g., user devices 116, 118, and 120) can display the graphical user interface after receiving aggregated FX data from the exchange computer system 110. A user of a device 310 can interact with a user interface panel 320a created by the device 310 after receiving aggregated exchange data (e.g., liquidity engine data 210) from the exchange computer system by a computer network (e.g., network 214). The user interface panel 320a can include fields that permit a user to enter a symbol (e.g., a FX pair symbol), select the type of the trade and specify an amount. As an example, the user can enter a symbol (e.g., "GBP/USD") corresponding to the currency pair involved in an order (e.g., FX trade order) through the device 310.

The user interface panel 320a may receive a series of aggregated FX values over successive periods of time, and the manner in which the user interface panel 320a displays these values and/or related data may be customizable based on user preferences or other parameters. As an example, the information displayed in user interface panel 320a may be customized to include both numerical and/or graphical representations of past, present, and/or projected aggregated FX values. The user interface panel 320a may additionally be customized to display information regarding present, past, and/or projected activities based on FX values (e.g., trading of financial instruments based on the aggregated exchange instruments, and other market activity related to the aggregated exchange values). For example, the user interface panel 320a may optionally display values of, and activity related to, financial instruments related to the aggregated FX market activity data, including FX futures. The user interface panel 320a can be configured to display values corresponding to one or both of a likely upside, a likely downside, of a price change for a FX currency pair.

The manner in which user interface panel 320a displays information may also vary depending on other parameters. For example, the computational resources of the user devices connected via network 114 to the exchange computer system 110 can vary greatly, and the user interface panel 320a may be adapted for display on each particular user device based on parameters associated with that device (including screen size, display resolution, processing speed, and available bandwidth). For instance, a user operating a PC may benefit from display of a larger amount of information, whereas a user interacting with the exchange via a smart phone might benefit from a more streamlined presentation of information. As another example, where bandwidth or processing resources are limited, user interface panel 320a can be configured to display information in less resource-intensive ways (e.g., through simplified graphics and text).

In general, the user interface panel 320a can be used to enter FX currency pair and trade information and additional information from a user. The user can click or enter an identifier of a first currency (e.g., Euros, as in the illustrated example) into an input element 325 (e.g., a text box, drop-down selector), and the user can click or enter an identifier of a second currency (e.g., US dollars, as in the illustrated example) into an input element 330. The device 310 can use the currencies identified by the user in the input elements 325 and 330 to identify a currency pair. Once the currency pair has been identified, the device 310 can update the user interface panel 320a to display a comparative chart 360a of the prices of the two selected currencies over a selectable period of time. In some implementations, the user interface panel 320a can include a user input 362 (e.g., a text input box, a drop down selector) with which a user can interact to define the period of time for which he or she wishes to see the comparative prices on the chart 360a (e.g., the most recent hour, the previous month, the year to date, the previous year).

The user can also click or otherwise select the types of information to be displayed. The user can interact with a user input 335 to select a type of information to be displayed for the currency type selected by the input element 325, and the user can interact with a user input 340 to select a type of information to be displayed for the currency type selected by the input element 330. The selected information is then displayed by a display element 345 and a display element 350. The user can interact with a user input 351 to define a quantity of a selected currency to sell, and the user can interact with a user input 352 to define a quantity of a selected currency to buy. In some implementations, the types of information can include one or more of an average sell price, an average buy price, an average bid price, and average offer price, an overall trade volume, an average buy or sell lot size, derivative indexes for a currency type, or combinations (not all shown) of these or any other appropriate information about a currency's trading activity. In the illustrated example, the user has chosen to see an average sell price for Euros in the display element 345, and an average buy price for US dollars in the display element 350.

The user interface panel 320a also includes a display element 355 that displays an average currency pair spread (e.g., a buy/sell spread, displayed in pips in the illustrated example). In some implementations, the value displayed by display element 355 can be averaged over the same time period as the information shown in the comparative chart 360a.

For example, the comparative chart 360a can be configured to display the most recent 24 hours' worth of Euro and US dollar prices, and the display element 355 can show a value representative of the average buy/sell spread for Euros and dollars over the most recent 24 hours. The chart 360a includes a selector 364a (e.g., represented as a vertical marker in the illustrated example) that a user can slide left or right in order to identify a specific time within the displayed window of time-ordered values. In some implementations, the display elements 345, 350, and/or 355 can be configured to display values of the selected currencies at a time identified through the user's interaction with the selector 364a.

In some implementations, the user interface panel 320a may be filter by one or more parameters, in which the corresponding comparative chart 360a may be refreshed or updated on the device 310 to include values based on filtered data. For example, the comparative chart 360a can be configured to show actual prices (e.g., raw data, no filtering), a moving average (e.g., averaged over one second, one minute, one hour), a periodic sampling (e.g., one sample per second, minute, hour) with intervening values being interpolated from sampled values, or any other appropriate form of data filtering.

Figure 3B:
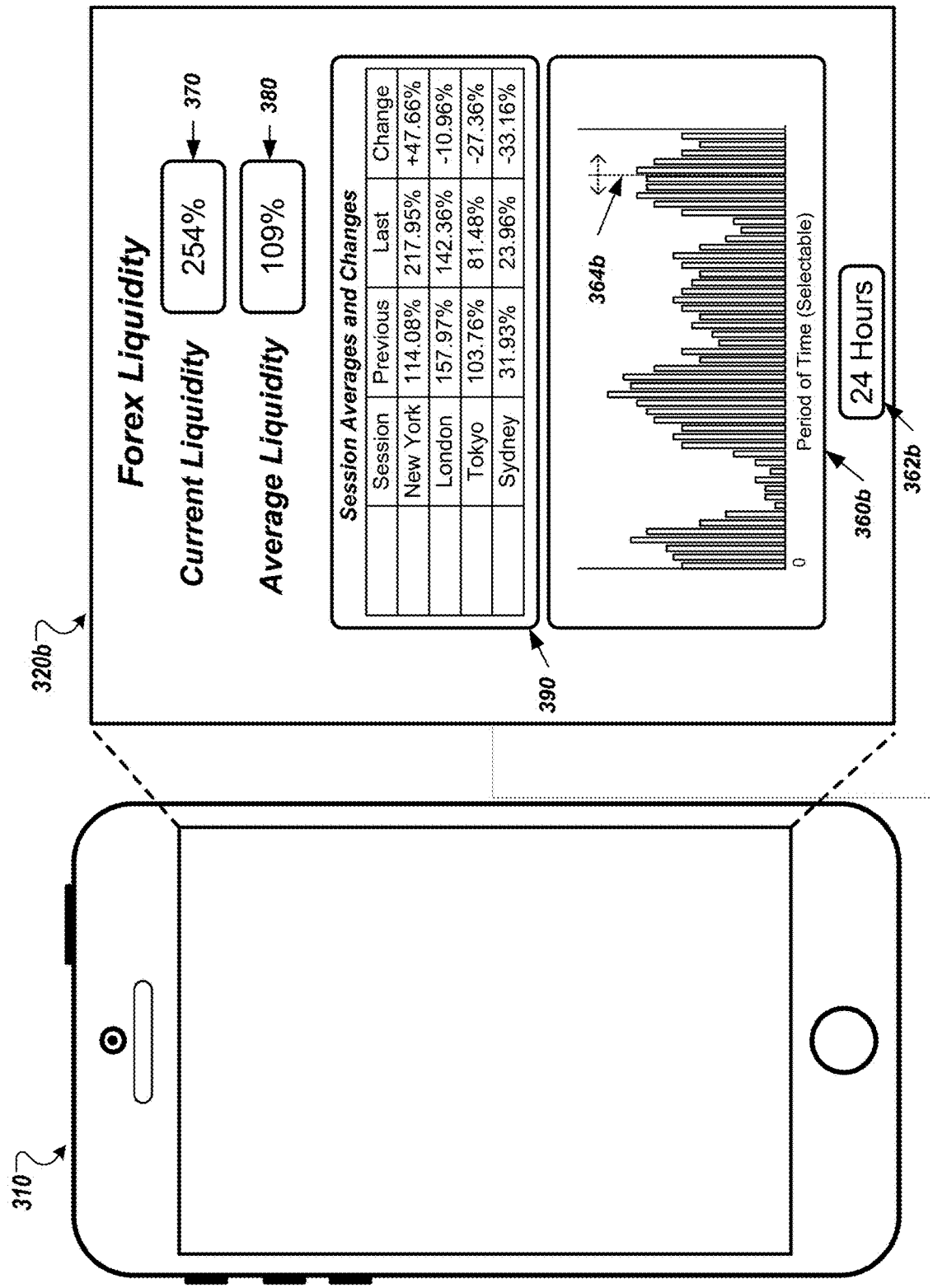
FIG. 3B is an illustration of an example graphical user interface for display of anonymized market liquidity values.

FIG. 3B is an illustration of an example graphical user interface for display of anonymized market liquidity values. In some implementations, the graphical user interface on the device 310 may be configurable to display aggregated or otherwise anonymized liquidity information. For example, a user can click, touch, swipe, scroll, or otherwise interact with the user device 310 to cause the user interface panel 320b to be displayed and show additional information can include anonymized liquidity information, a midpoint price, and/or trading volume.

The user interface panel 320b provides visual estimates of the trading activity in the FX market. The user interface panel 320b shows a current liquidity value in a display element 370, and an average liquidity value in a display element 380, to allows a user to understand and view current liquidity and liquidity in previous sessions, in substantially (e.g., pseudo) real time. In some implementations, higher liquidity can mean better spreads, as more transactions are being made.

In some implementations, liquidity calculations can aggregate and anonymize the liquidity of many brokers and many traded currencies to calculate an anonymized liquidity per each interval (e.g., minute, hour) for a selected period of time (e.g., the last day, the last 48 hours, the last week). A table of session liquidity is displayed in a display element 390, and a chart of time-ordered, anonymized average session liquidity values is displayed by a chart 360b.

In some implementations, the chart 360b can include a zoom in feature that provides a user with an ability to zoom in or out, and/or select a custom timeframe, after which the anonymized liquidity can be automatically re-calculated. The average liquidity (e.g., of the past 24 hours) can be displayed by the display element 380, and can be used as a 100% liquidity basis for percentage calculation (number of ticks divided by average spread). For example, a 110% reading will tell you that the current liquidity is 10% above the last 24 hours average liquidity. The chart 360b includes a selector 364b (e.g., represented as a vertical marker in the illustrated example) that a user can slide left or right in order to identify a specific time within the displayed window of time-ordered values. In some implementations, the display elements 370, 380, and/or 390 can be configured to display liquidity values at a time identified through the user's interaction with the selector 364b.

Figure 4:
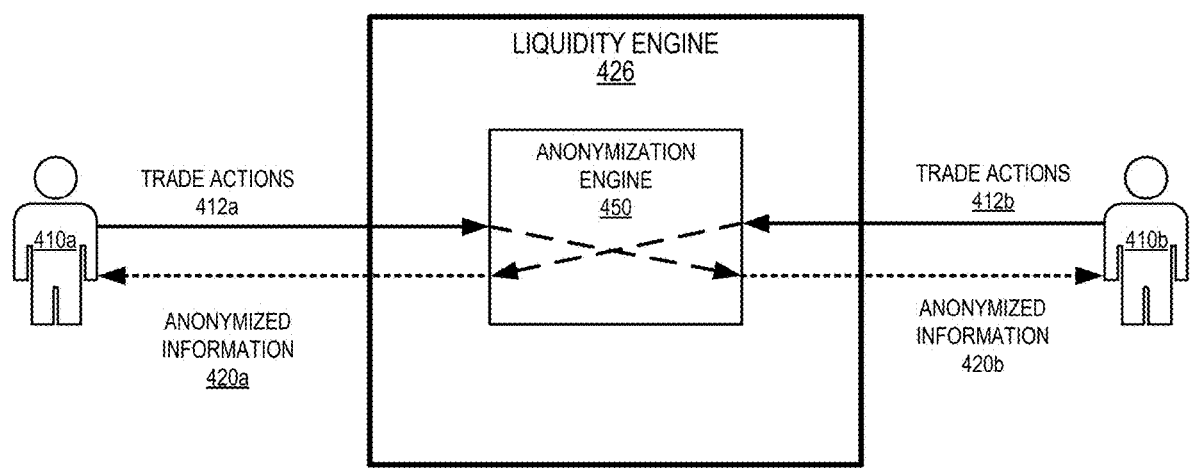
FIG. 4 is a block diagram of an example liquidity engine.

FIG. 4 is a conceptual block diagram of an example liquidity engine 426. The liquidity engine 426 may be implemented using a combination of software and hardware. The liquidity engine 426 may, for example, be implemented as one or more hardware processors configured to execute one or more algorithms. In some implementations, the liquidity engine 426 can be the example liquidity engine 136 of FIG. 1, and/or the example liquidity engine 236 of FIG. 2. In the conceptual example, a trader 410a and a trader 410b both participate in market trading by undertaking various trade actions 412a, 412b (e.g., bids, offers, sales, purchases). The trade actions 412a, 412b are received or otherwise determined by the liquidity engine 426.

The liquidity engine 426 includes an anonymization engine 450. The anonymization engine 450 interacts with, transforms, or otherwise modifies information about the trade actions 412a, 412b obfuscate or remove identification information about the traders 410a, 410b (e.g., bidders, sellers, liquidity providers) from their corresponding trade actions 412a, 412b and/or other exchanges, databases, liquidity reports, or any other appropriate source of trading information. As will be discussed in additional detail in the description of FIG. 5, the anonymization engine 450 provides anonymized liquidity information 420a to the trader 410a, for example, so the trader 410a remains unaware of the specific identity and actions of the trader 410b. The anonymization engine 450 provides anonymized liquidity information 420b to the trader 410b, for example, so the trader 410b remains unaware of the specific identity and actions of the trader 410a.

In some implementations, the content of the anonymized trade information 420a can be different from the anonymized liquidity information 420b. For example, not all FX trading participants can trade all available currencies. In such examples, the trader 410a may not be able to trade the same currencies and/or derivative products as the trader 410b, and as a result different raw FX data may be available to each and the resulting anonymized trade information 420a may be different from the anonymized liquidity information 420b. In another example, trader 410a may be able to withhold their trade actions 412a partly or completely from the liquidity engine 426 or the trader 410b (e.g., even in an anonymized form). As such, the anonymized liquidity information 420a may be different from the anonymized liquidity information 420b.

Figure 5:
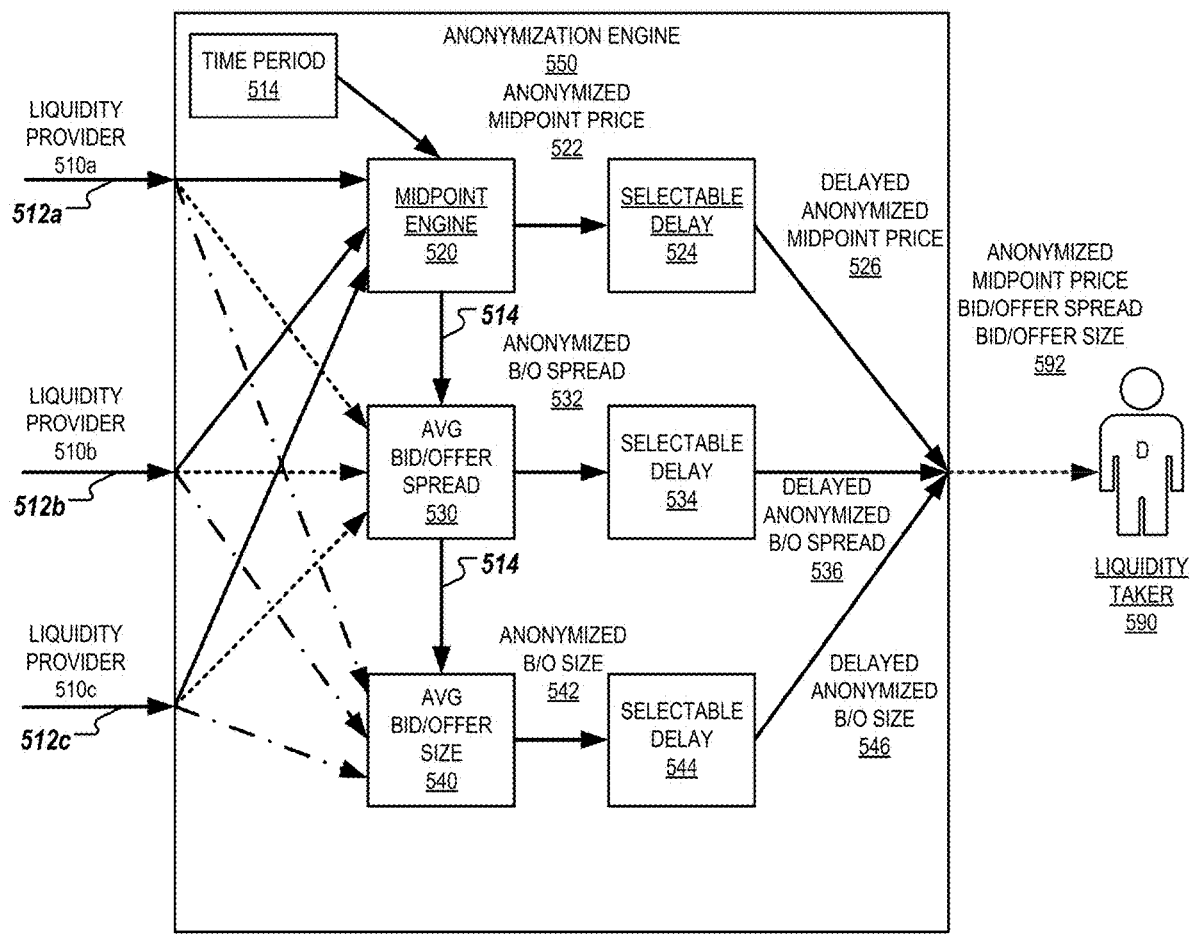
FIG. 5 is a block diagram of an example anonymization engine.

FIG. 5 is a conceptual block diagram of an example anonymization engine 550. The anonymization engine 550 may be implemented using a combination of software and hardware. The anonymization engine 550 may, for example, be implemented as one or more hardware processors configured to execute one or more algorithms. In some implementations, the anonymization engine 550 can be the example liquidity engine 136 of FIG. 1, the example liquidity engine 236 of FIG. 2, and/or the example anonymization engine 450 of FIG. 4.

In the illustrated example, the anonymization engine 550 receives or otherwise obtains various types of data including, liquidity information and values associated with particular financial instruments (e.g., currencies), trade activity information 512a (e.g., FX or other exchange information about bids, offers, sales, purchases) about a liquidity provider 510a, trade activity information 512b about a liquidity provider 510b, and trade activity information 512c about a liquidity provider 510c. A liquidity taker 590 is subscribed to or otherwise receives exchange trading information 592. Although the illustrated example shows three liquidity providers and a single liquidity taker, in actual use the anonymization engine 550 could be acting as a data broker between hundreds or thousands of liquidity providers and takers.

In some implementations, the anonymization engine 550 can produce one or more types of liquidity reports, either weekly, monthly, or at any other specified duration. Examples of liquidity reports can include a deposit tracker report of a current amount of aggregated deposits and/or a forecast of aggregated deposits anticipated in the future. Such anonymized reports can provide indications about loan-to-deposit (LTD) ratios in the immediate short term and can include information such as aggregated month-end actuals for deposits by customer type, aggregated month-end change, aggregated customer assets and the LTD ratio, and/or aggregated month-end forecasts for the position to the end of the year.

Another example liquidity report can be a daily liquidity report that can provide an anonymized, aggregated indicator of multiple banks' liquid and marketable assets and liabilities (e.g., up to 1-year maturity and beyond), and/or aggregated end-of-day of the bank liquidity positions. Another example liquidity report can be a funding maturity gap report, also called a mismatch report, that can reflect a maturity gap for all assets and liabilities per time interval and with an adjustment for liquid securities. The report can aggregate the cumulative liquidity cash flow of the daily liquidity report. The report can also used to generate a cash flow survival horizon report. Another example liquidity report can be a liquidity stress test report that shows the results of individual shocks on a liquidity ratio, and a probability of each result occurring.

The anonymization engine 550 receives or otherwise obtains time period information 514 that identifies a predetermined period of time (e.g., a most recent or other minute, hour, day, week, month, year) to be associated with subsequent calculations and/or determinations to be performed by the anonymization engine 550. In some implementations, the time period information 514 can be the same for all users, or it can be set on a per-user basis (e.g., based on the liquidity taker's 590 subscription level or privilege level. In some implementations, the time period information 514 can be selectable by a user such as the liquidity taker 590.

The anonymization engine 550 includes a midpoint engine 520. The midpoint engine 520 receives the trade activity information 512a, 512b, and 512c, and the time period information 514, and determines a midpoint price value 522. The midpoint price value 522 is a midpoint or average value based on the specific actions of the liquidity providers 510a-510c during the period of time identified by the time period information 514. Since the underlying trade activity information 512a-512c has been combined while performing the averaging or midpoint determination, the specific actions of the liquidity providers 510a-510c becomes obfuscated or otherwise anonymized.

The anonymization engine 550 includes a delay module 524 that is configured to receive the midpoint price value 522. The delay module 524 can be a data buffer linked to a clock and configured to introduce a fixed or configurable delay between receipt of the midpoint price value 522 by receiving and storing the midpoint price value 522 for a predetermined length of time (e.g., 15 seconds, 15 minutes, one hour, one day) before subsequently retransmitting the midpoint price value 522 as a delayed midpoint price value 526. In some implementations, the delay module 524 can be configured to add substantially no additional delay.

The anonymization engine 550 includes a bid/offer spread engine 530. The bid/offer spread engine 530 receives the trade activity information 512a, 512b, and 512c, and the time period information 514, and determines a bid/offer spread value 532. The bid/offer spread value 532 is an average of the differences between bid values and offer values based on the bids and offers of the liquidity providers 510a-510c during the period of time identified by the time period information 514. Since the underlying trade activity information 512a-512c has been combined while determining the bid/offer spread value 532, the specific actions of the liquidity providers 510a-510c becomes obfuscated or otherwise anonymized.

The anonymization engine 550 includes a delay module 534 that is configured to receive the bid/offer spread value 532. The delay module 534 can be configured to introduce a fixed or configurable delay between receipt of the bid/offer spread value 532 and subsequent retransmission of the bid/offer spread value 532 as a delayed bid/offer spread value 536. In some implementations, the delay module 534 can be configured to add substantially no additional delay.

The anonymization engine 550 includes a bid/offer size engine 540. The bid/offer size engine 540 receives the trade activity information 512a, 512b, and 512c, and the time period information 514, and determines a bid/offer size information 542. The bid/offer size information 542 includes an average bid size value and/or an average offer size value based on the bids and offers of the liquidity providers 510a-510c during the period of time identified by the time period information 514. Since the underlying trade activity information 512a-512c has been combined while determining the bid/offer size information 542, the specific actions of the liquidity providers 510a-510c becomes obfuscated or otherwise anonymized.

The anonymization engine 550 includes a delay module 544 that is configured to receive the bid/offer size information 542. The delay module 544 can be configured to introduce a fixed or configurable delay between receipt of the bid/offer size information 542 and subsequent retransmission of the bid/offer size information 542 as delayed bid/offer size information 546. In some implementations, the delay module 544 can be configured to add substantially no additional delay.

The anonymization engine 550 then combines one or more of the delayed midpoint price value 526, the delayed bid/offer spread value 536, and/or the delayed bid/offer size information 546, as the exchange trading information 592. The liquidity taker 590 can receive the exchange trading information 592 and use it to perform trading activity or as an input for subsequent triggers and/or algorithmic operations.

Since the exchange trading information 592 is vastly data-reduced compared to the amount of information in the underlying trade activity information 512a, 512b, and 512c, the amount of network bandwidth required to convey information about market liquidity movements to the liquidity taker 590 can be greatly reduced and take much less time to transmit. Furthermore, in examples in which multiple liquidity takers are subscribed to the same exchange trading information 592 feed as the liquidity taker 590, a single collection of computer and network intensive operations can be performed once, and then subsequent results can be transmitted and re-transmitted to the multiple liquidity takers. In some implementations, the anonymization engine 550 can include a cache module configured to hold a copy of the exchange trading information 592 for a predetermined length of time or between updates and provide the cached copy to liquidity providers instead of re-engaging in the computing and bandwidth intensive operations that are used to generate the exchange trading information 592.

Since the exchange trading information 592 is vastly data-reduced compared to the amount of information in the underlying trade activity information 512a, 512b, and 512c, the anonymization engine 550 can obfuscate that activities of the liquidity providers 510a-510c and make their identities and activities anonymous to the liquidity taker 590. For example, the liquidity provider 510b may perform an unusually large sale or purchase, and while these actions could influence the exchange trading information 592, the liquidity taker 590 will not receive any information that explicitly identifies the liquidity provider 510b or the action they took. Furthermore, the specific action(s) of the liquidity provider 510b will be buffered by the parallel actions of the liquidity providers 510a and 510c, so the exact size of the liquidity provider's 510b actions during the time period described by the time period information 514 will be unknown to the liquidity taker 590. Similar anonymization and/or obfuscation of the bid/offer spread value 536 and/or the bid/offer size information 546 can offer similar protections to the privacy of the liquidity providers 510a-510c while still providing a valuable source of actionable exchange trading information to the liquidity taker 590.

In some implementations, the delays introduced by the delay modules 524, 534, and 544 can be at least partly random or pseudo-random to further anonymize the actions of liquidity providers. For example, the liquidity taker 590 may have access to additional trading information (e.g., not provided by the anonymization engine 550 or the exchange computer system 110) that identifies when a particular liquidity provider takes an action, but not the size of that action. To further anonymize the activities of the liquidity providers 510a-510c, pseudo-random delays can be used to decouple the influence of an individual action on the resulting exchange trading information 592. By obfuscating not only the identities and sizes of exchange trading actions, but also by obfuscating the exact times associated with such actions, the anonymization engine 550 can make it even more difficult for the liquidity taker 590 to identify the actions of a particular liquidity provider, for example, by combining the exchange trading information 592 and the liquidity taker's 590 additional external intelligence to partly de-anonymize the exchange trading information 592 and infer the specific identity or action of one or more of the liquidity providers 510a-510c.

Figure 6:
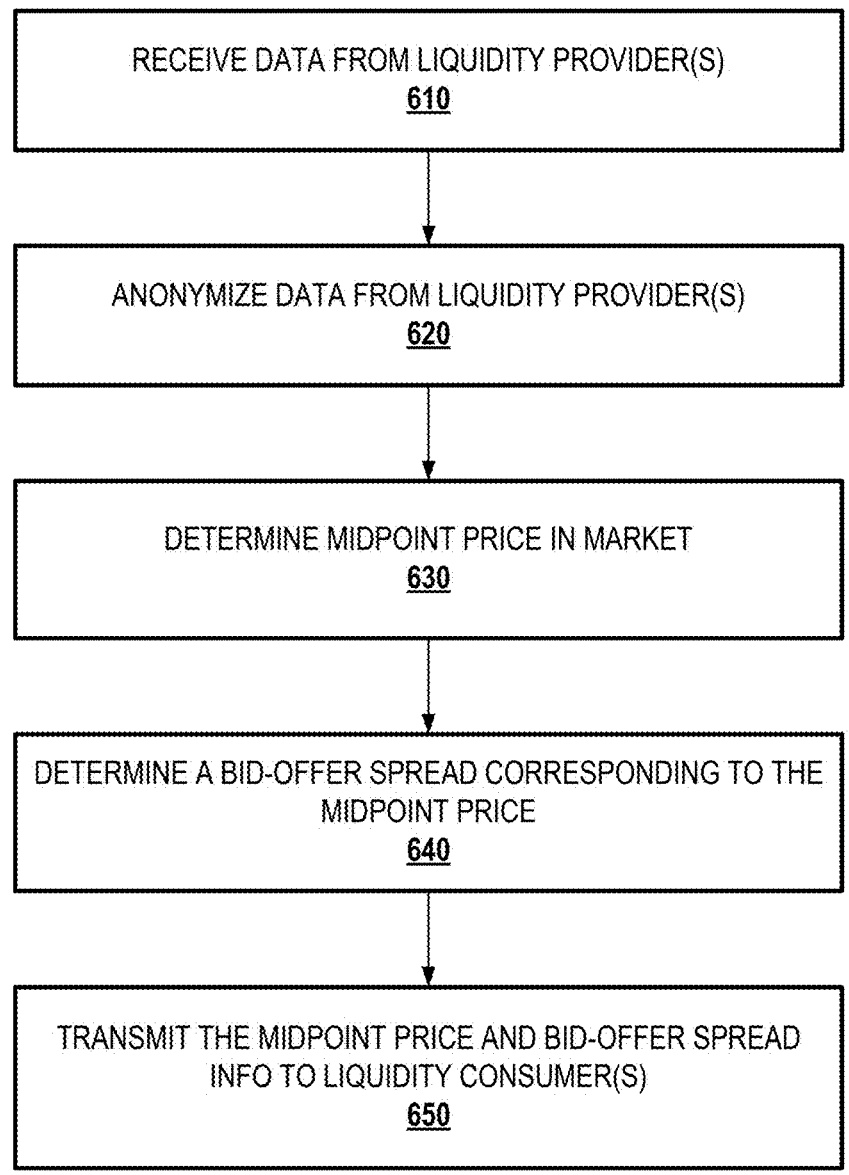
FIG. 6 is a flow diagram of an example liquidity process.

FIG. 6 is a flow diagram of an example liquidity process 600. In some implementations, the process 600 can be performed in part or entirely by one or more of the example exchange computer system 110 or the example liquidity engine 136 of FIG. 1, the example exchange computer system 200 of the example liquidity engine 236 of FIG. 2, the example liquidity engine 426 of FIG. 4, or the example anonymization engine 550 of FIG. 5.

At 610, data is received from one or more liquidity providers. For example, the anonymization engine 550 can receive or otherwise obtain the trade activity information 512a-512c (e.g., information about bids, offers, sales, purchases) about the liquidity providers 510a-510c.

At 620, the data is anonymized to remove identification information that may be descriptive of one or more liquidity providers. For example, the trade activity information 512a-512c for liquidity prices during a predetermined period of time is combined by the anonymization engine 550, thereby decoupling the pricing information from the identities of the corresponding traders, thereby anonymizing the data.

At 630, a midpoint price of a financial instrument is determined based on the anonymized data. For example, the combined pricing information of step 620 is processed by the midpoint engine 520 to determine the anonymized midpoint price value 522 for trading activity during the predetermined period of time.

At 640, a bid-offer spread corresponding to the midpoint price is determined based on the anonymized data. For example, the combined pricing information of step 620 is processed by the bid/offer spread engine 530 to determine the anonymized bid/offer spread value 532 for trading activity during the predetermined period of time.

At 650, the midpoint price and the bid-offer spread are transmitted over a computer network to one or more computing devices associated with a market participant. For example, the anonymization engine 550 can transmit the exchange trading information 592 to the liquidity taker 590 or to the user devices 120, 118, 116, and/or 310 over the network 114.

In some implementation, one or both of the midpoint price and the bid-offer spread can be determined based on anonymized liquidity provision data from the one or more liquidity providers recorded during a predetermined period of time. For example, the exchange trading information 592 can be determined based on the time period information 514 (e.g., the exchange trading information 592 can represent a predetermined 15 seconds' worth of information, a day's worth, a week's worth).

In some implementations, one or both of the midpoint price and the bid-offer spread can be determined in substantially real-time. For example, the exchange trading information 592 can be computed and transmitted substantially immediately thereafter to the liquidity taker 590 (e.g., no additional intentional delay by the delay modules 524, 534, and/or 544).

In some implementations, one or both of the midpoint price and the bid-offer spread are valid for a predetermined period of time after being determined. For example, the exchange trading information 592 can be computed once per second and can be considered valid for a one-second period of time, until it becomes outdated by the next re-computing of the exchange trading information 592. In another example, the exchange trading information 592 can be computed once per minute, but the device 310 may be configured to regard an exchange trading information 592 update as being valid for one hour (e.g., to reduce the frequency of data requests and associated computing and bandwidth demands), after which the exchange trading information 592 held by the device 310 is invalidated and optionally replaced by requesting a fresher copy of the exchange trading information 592.

In some implementations, the process 600 can include identifying one or more trades of the financial instrument, transmitting the identified one or more trades over the computer network to one or more computing devices associated with the market participant. For example, the exchange trading information 592 can be requested by or transmitted to the device 310 of the liquidity taker 590.

In some implementations, the process 600 can include determining an average bid-offer spread corresponding to the determined bid-offer spread. For example, the example bid/offer size engine 540 can receive the trade activity information 512a, 512b, and 512c, and the time period information 514, and determine the bid/offer size information 542 that can be included as part of the exchange trading information 592 provided to the liquidity taker 590 or to the user devices 120, 118, 116, and/or 310 over the network 114.

Figure 7:
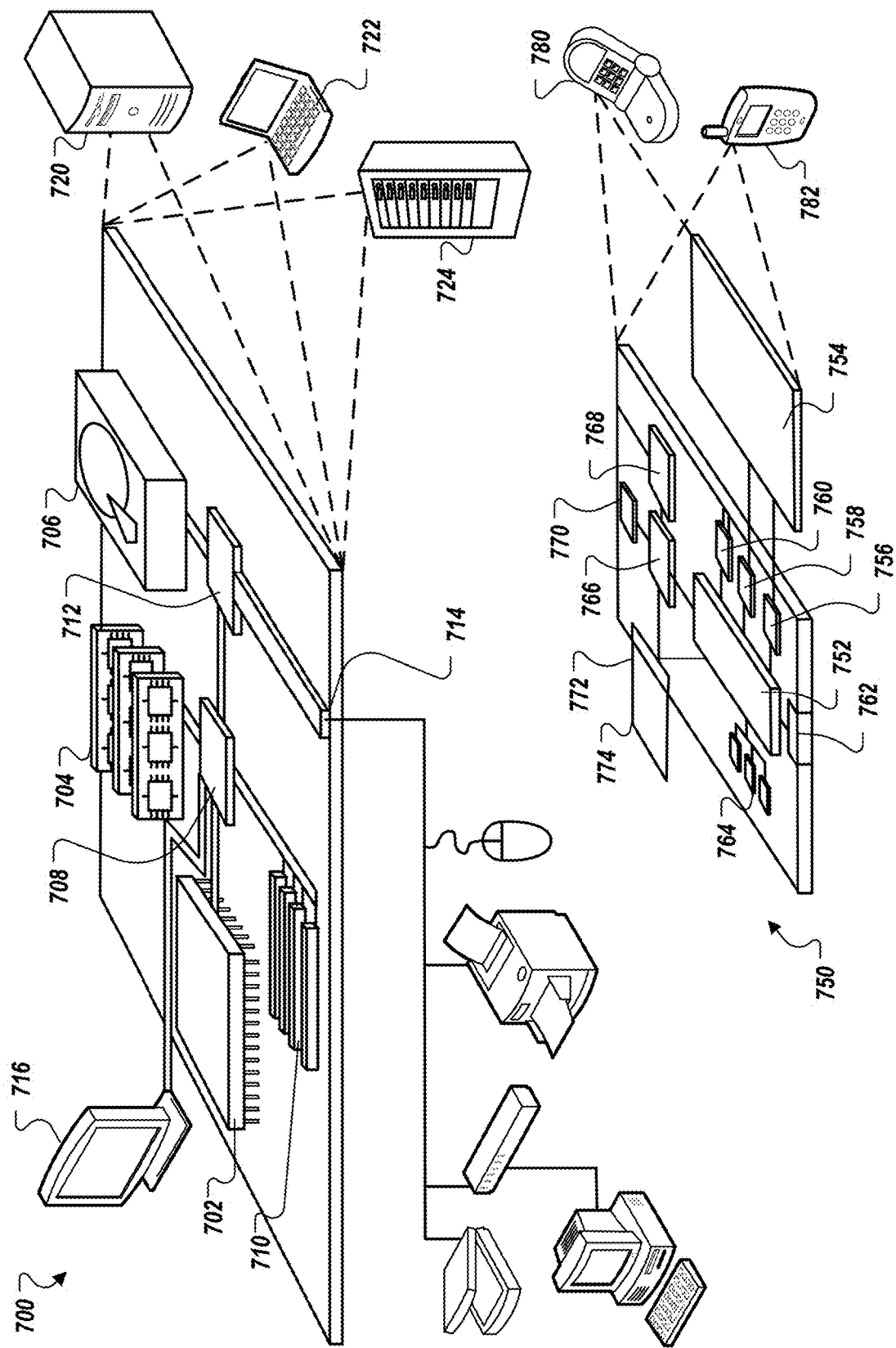
FIG. 7 is a computing device for an exchange computer system.

FIG. 7 is a schematic diagram illustrating an example of a computing system used in an exchange computer system. The computing system includes computing device 700 and a mobile computing device 750 that can be used to implement the techniques described herein. For example, one or more components of the exchange computer system 110 be an example of the computing device 700 or the mobile computing device 750.

The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various buses, and may be mounted on a common motherboard or in other manners as appropriate. The processor 702 can process instructions for execution within the computing device 700, including instructions stored in the memory 704 or on the storage device 706 to display graphical information for a Graphical User Interface (GUI) on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 702 is a single threaded processor. In some implementations, the processor 702 is a multi-threaded processor. In some implementations, the processor 702 is a quantum computer.

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702). The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may include one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750 or may also store applications or other information for the mobile computing device 750. Specifically, the expansion memory 774 may include instructions to carry out or supplement the processes described above and may include secure information also. Thus, for example, the expansion memory 774 may be provided as a security module for the mobile computing device 750 and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (nonvolatile random-access memory). In some implementations, instructions are stored in an information carrier such that the instructions, when executed by one or more processing devices (e.g., processor 752), perform one or more methods, such as those described above. The instructions can also be stored by one or more storage devices, such as one or more computer or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry in some cases. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 3G/4G cellular, among others. Such communication may occur, for example, through the transceiver 768 using a radio frequency. In addition, short-range communication may occur, such as using a Bluetooth, Wi-Fi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, among others) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Implementations have been described, but other implementations are within the scope of the following claims.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Implementations of the functional operations and/or actions described in this specification may be implemented in digital electronic circuitry, or in computer software, firmware, or hardware, including the structures disclosed in this specification and their structural equivalents, or in combinations of one or more of them. The operations may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, a computer having a display device may be implemented, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Features may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be combined in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, in some implementations of FIG. 6, step 640 may be performed before or at the same time as step 630. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. An information anonymization system comprising:
   a liquidity engine comprising one or more processors;
   a transceiver coupled to a computer network and coupled to the one or more processors of the liquidity engine and communicatively coupled to one or more computing devices associated with a market participant and one or more liquidity providers over the computer network; and
   a non-transitory, computer-readable medium storing one or more machine-readable instructions that, when executed, cause the one or more processors to perform information anonymization operations, the financial anonymization operations comprising:
      receive, by the transceiver and over the computer network, data from the one or more liquidity providers;
      anonymize, by the one or more processors of the liquidity engine, the received data to remove identification information that is descriptive of the one or more liquidity providers;
      determine, by the one or more processors of the liquidity engine, a midpoint price of a financial instrument based on the anonymized received data;
      determine, by the one or more processors of the liquidity engine, a bid-offer spread corresponding to the midpoint price based on the anonymized received data; and
      transmit, by the transceiver, the midpoint price and the bid-offer spread over the computer network to the one or more computing devices associated with a market participant.

2. The information anonymization system of claim 1, wherein one or both of the midpoint price and the bid-offer spread are determined based on anonymized liquidity provision data from one or more liquidity providers recorded during a predetermined period of time.

3. The information anonymization system of claim 1, wherein one or both of the midpoint price and the bid-offer spread are determined in substantially real-time.

4. The information anonymization system of claim 1, wherein one or both of the midpoint price and the bid-offer spread are valid for a predetermined period of time after being determined.

5. The information anonymization system of claim 1, wherein:
   the machine-readable instructions are further configured to identify one or more trades of the financial instrument; and
   the transceiver is further configured to transmit the identified one or more trades over the computer network to the one or more computing devices associated with the market participant.

6. The information anonymization system of claim 1, wherein the machine-readable instructions are further configured to delay, by a predetermined amount of time, transmission of one or both of the determined midpoint price and the determined bid-offer spread.

7. The information anonymization system of claim 1, wherein the machine-readable instructions are further configured to determine an average bid-offer spread corresponding to the determined bid-offer spread.

8. A non-transitory computer-readable storage medium storing instructions that, when executed by one or more processors in an exchange computer system, cause the one or more processors to perform operations of an information anonymization system comprising a liquidity engine, the operations comprising:
   receiving, by a transceiver coupled to a computer network and coupled to the one or more processors, data over the computer network from one or more liquidity providers;
   anonymizing, by the one or more processors of the liquidity engine, the data to remove identification information that is descriptive of one or more liquidity providers;
   determining, by the one or more processors of the liquidity engine, a midpoint price of a financial instrument based on the anonymized received data;
   determining, by the one or more processors of the liquidity engine, a bid-offer spread corresponding to the midpoint price based on the anonymized received data; and
   transmitting, by the transceiver, the midpoint price and the bid-offer spread over the computer network to one or more computing devices associated with a market participant.

9. The non-transitory computer-readable storage medium of claim 8, wherein one or both of the midpoint price and the bid-offer spread are determined based on anonymized liquidity provision data from the one or more liquidity providers recorded during a predetermined period of time.

10. The non-transitory computer-readable storage medium of claim 8, wherein one or both of the midpoint price and the bid-offer spread are determined in substantially real-time.

11. The non-transitory computer-readable storage medium of claim 8, wherein one or both of the midpoint price and the bid-offer spread are valid for a predetermined period of time after being determined.

12. The non-transitory computer-readable storage medium of claim 8, wherein the operations further comprise:
identifying one or more trades of the financial instrument; and
transmitting the identified one or more trades over the computer network to the one or more computing devices associated with the market participant.

13. The non-transitory computer-readable storage medium of claim 8, wherein the operations further comprise delaying, by a predetermined amount of time, transmission of one or both of the determined midpoint price and the determined bid-offer spread.

14. The non-transitory computer-readable storage medium of claim 8, wherein the operations further comprise determining an average bid-offer spread corresponding to the determined bid-offer spread.

15. A method of information anonymization, the method comprising:
receiving, by a transceiver coupled to a computer network and coupled to one or more processors of an information anonymization system comprising a liquidity engine and communicatively coupled to one or more computing devices associated with a market participant and one or more liquidity providers over the computer network, data from the one or more liquidity providers, wherein the information anonymization system comprises the transceiver, and the liquidity engine comprises the one or more processors and a non-transitory, computer-readable medium storing one or more machine-readable instructions that, when executed, cause the one or more processors to perform information anonymization operations; and
executing, by the one or more processors, the machine-readable instructions to perform information anonymization operations comprising:
anonymizing, by the one or more processors of the liquidity engine, the data to remove identification information that is descriptive of one or more liquidity providers;
determining, by the one or more processors of the liquidity engine, a midpoint price of a financial instrument based on the anonymized received data;
determining, by the one or more processors of the liquidity engine, a bid-offer spread corresponding to the midpoint price based on the anonymized received data; and
transmitting, by the transceiver, the midpoint price and the bid-offer spread over the computer network to the one or more computing devices associated with a market participant.

16. The method of claim 15, wherein one or both of the midpoint price and the bid-offer spread are determined based on anonymized liquidity provision data from the one or more liquidity providers recorded during a predetermined period of time.

17. The method of claim 15, wherein one or both of the midpoint price and the bid-offer spread are determined in substantially real-time.

18. The method of claim 15, wherein one or both of the midpoint price and the bid-offer spread are valid for a predetermined period of time after being determined.

19. The method of claim 15, further comprising:
identifying one or more trades of the financial instrument; and
transmitting the identified one or more trades over the computer network to one or more computing devices associated with the market participant.

20. The method of claim 15, further comprising determining an average bid-offer spread corresponding to the determined bid-offer spread.

21. A computer system comprising:
a liquidity engine comprising one or more processors with machine-readable instructions that, when executed, cause the one or more processors to perform operations comprising:
receive data from one or more liquidity providers;
anonymize the received data to remove identification information that is descriptive of the one or more liquidity providers;
determine a midpoint price of a financial instrument based on the anonymized data; and
determine a bid-offer spread corresponding to the midpoint price based on the anonymized data; and
a transceiver coupled to the one or more processors of the liquidity engine and configured to transmit the midpoint price and the bid-offer spread over a computer network to one or more computing devices associated with a market participant.

* * * * *